Figure 1:
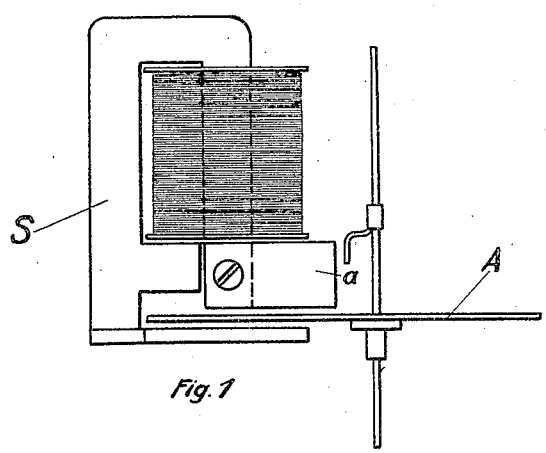

April 15, 1924.                     P. GUSTAVUS                    1,490,384

INDUCTION METER

Filed April 24, 1922

Inventor:
Paul Gustavus,
by
His Attorney.

Patented Apr. 15, 1924.

1,490,384

UNITED STATES PATENT OFFICE.

PAUL GUSTAVUS, OF BERLIN, GERMANY, ASSIGNOR TO GENERAL ELECTRIC COMPANY, A CORPORATION OF NEW YORK.

INDUCTION METER.

Application filed April 24, 1922. Serial No. 556,321.

*To all whom it may concern:*

Be it known that I, PAUL GUSTAVUS, a citizen of Germany, residing at Berlin, in the State of Prussia, Germany, have invented certain new and useful Improvements in Induction Meters; and I do hereby declare the following to be a full, clear, and exact description of the invention, such as will enable others skilled in the art to which it appertains to make and use the same.

My invention relates to electric meters of the induction type and more in particular to simple, convenient and inexpensive devices for compensating for the friction load and for preventing the operation of such meters at no load. The object of the improvements is to provide a meter of this type in which two projecting members of magnetic material are provided one beside the other on the magnetic core, each performing one of the said functions. One of the said members is adapted to be bent laterally to regulate the subsidiary torque, while the other one is set in position for providing a subsidiary pole and preventing the operation of the meter by the potential coil of the instrument under no load. This construction is preferable as compared to a construction in which the said members are disposed one above the other for the reason that for each of the members the whole breadth between the meter disk and the body of the coil is made use of.

For the purpose of explaining the invention an example embodying the same has been shown in the accompanying drawing in which the same reference characters have been used in all the views to indicate corresponding parts. In said drawing,—

Figure 2:
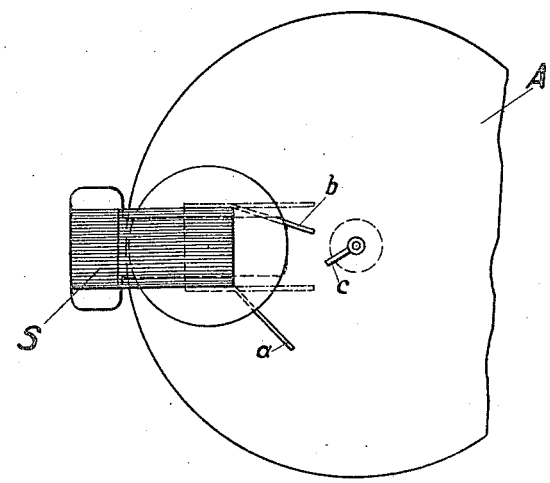

Fig. 1, is an elevation of the pressure core and the disk cooperating therewith, and Fig. 2, is a partial plan view of Fig. 1.

In the example shown in the drawing the pressure core S is disposed radially of the disk A, and two sheet metal plates $a$ and $b$ of magnetic material project each from one side of the upper pole of the core S and substantially toward the axis of the disk, the plate $a$ being designed to provide the subsidiary torque and being bent away from the radial position, and the plate $b$ being in position for cooperating with a flap $c$ of magnetic material on the meter shaft to prevent the operation of the meter under no load by pressure.

While in describing the invention reference has been made to an example in which the members $a$ and $b$ are spaced apart, I wish it to be understood that my invention is not limited to this feature.

I claim:

1. In an electric meter of the induction type, a potential magnet, a meter disc cooperating therewith, a shaft for rotatably supporting said disc, an arm of magnetic material on said shaft, and a pair of adjustable magnetic members secured in fixed positions on said potential magnet adjacent said disc, one of said members being in a position to produce a subsidiary torque on said disc for supplying the friction losses of said meter and the other of said members being in a position to cooperate with said arm to prevent the rotation of the disc at no load.

2. In an electric meter of the induction type, a potential magnet, a meter disc cooperating therewith, a shaft for rotatably supporting said disc, an arm of magnetic material on said shaft and a pair of magnetic members rigidly secured to said potential magnet adjacent said disc, one of said members being adjustable to compensate for the frictional losses of said meter and the other member being adjustable with respect to said magnetic arm for preventing rotation of the meter disc at no load, said adjustment being made by bending said members in such directions that one adjustment does not affect the other.

In testimony whereof I hereunto affix my signature.

PAUL GUSTAVUS.